United States Patent Office 3,163,455
Patented Dec. 29, 1964

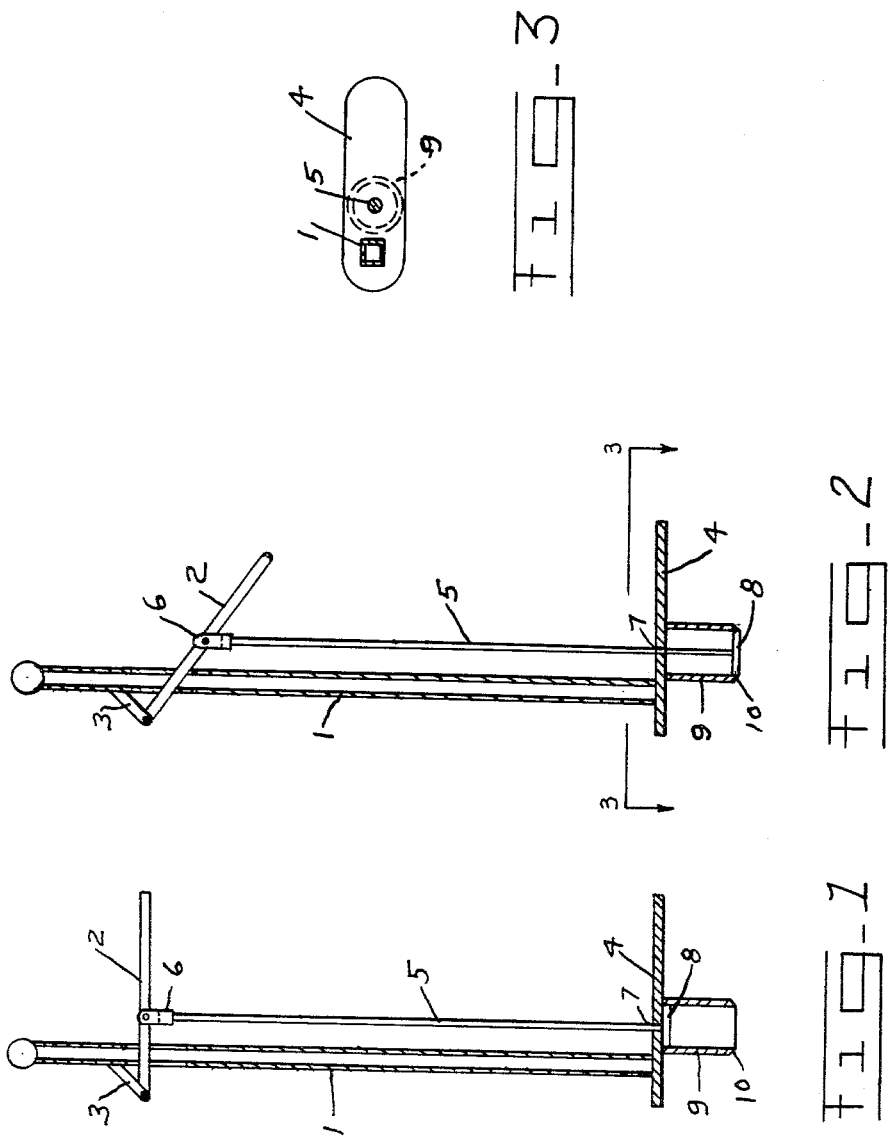

3,163,455
GRASS SODDING AND PLANTING TOOL
Dewey R. Tuggle, Sr., 112 N. 54th St., Birmingham, Ala.
Filed Aug. 6, 1962, Ser. No. 214,919
1 Claim. (Cl. 294—50.5)

This invention relates to a grass sodding and planting tool. It has for its main objects to provide such a tool that will be highly satisfactory for the purpose intended, simple in structure, cheap to manufacture, easy to use and keep in serviceable condition, and very durable.

Other objects and advantages will appear from the drawing and specification.

By referring generally to the drawing it will be observed that—

FIG. 1 is a side elevational view of tool made according to this invention with the handle and piston in up position.

FIG. 2 is a side elevational view showing the tool with handle and piston in down position.

FIG. 3 is a sectional view on line 3—3 of FIG. 2.

Similar reference numerals refer to similar parts throughout the several views.

Referring to the drawing in detail it will be seen that the tool comprises a main hollow bar 1 and a handle 2 pivotally connected to a link 3 which in turn is attached to the main bar. A cross plate 4 is attached to the lower end of the main bar. A connecting rod 5 is connected swingably to the handle at 6 by bolt means and has its lower end extending through hole 7 in the cross plate and has a piston 8 attached to is end. A cylinder part 9 is attached to the under face of the plate. The lower edge 10 of the cylinder part is formed sharp. As shown in FIGS. 1 and 2 one end of the plate 4 extends a substantial distance beyond the cylinder part 9 to provide a foot engaging member for forcing the cylinder part 9 into the ground.

From the foregoing it will appear that with the piston in up position the cylinder portion may be pushed by manual means to form a hole in the ground and then by pushing the handle downward the ground portion will be pushed out of the cylinder. Then with the cylinder empty it can be pushed downward over a sod of grass to be removed and planted in the hole that has been made in the ground. By such use the tool is adapted for easily planting sods of grass in bad spots in a lawn. Also may be used for other sodding purposes.

The tool may be made of any material suitable for the purpose, but I prefer to use good grades of metal; also it may be made in different sizes and capacities depending on how and where to be used.

While I have shown and described the preferred embodiment of my invention, I do not wish to limit same to exact and precise details of structure, and I reserve the right to make all modifications and changes so long as they remain within the scope of the invention and the following claims.

Having described my invention I claim:

A grass sodding and planting tool comprising:
(a) a vertically extending sleeve-like member having a relatively sharp lower edge disposed to penetrate ground,
(b) a relatively flat, transverse plate extending across the upper end of said sleeve-like member with the ends of said plate projecting beyond said sleeve-like member whereby at least one end of said plate-like member defines a foot engaging member for forcing said sleeve-like member into the ground,
(c) there being a vertical opening through said plate within the confines of said sleeve-like member,
(d) a first vertical rod extending through said opening,
(e) a piston-like member carried by the lower end of said first vertical rod and disposed for vertical movement within said sleeve-like member,
(f) a second vertical rod secured rigidly at its lower end to said transverse plate,
(g) there being a transverse, vertically extending slot through said second vertical rod intermediate the ends thereof,
(h) an elongated handle member having a portion adjacent one end thereof extending through said slot,
(i) means pivotally connecting the upper end of said first vertical rod to said handle member intermediate the ends of said handle member and in spaced relation to said second vertical rod, and
(j) means pivotally supporting said one end of said handle member in spaced relation to said second vertical rod and at the side of said second vertical rod which is opposite the first vertical rod connection whereby said handle member is disposed to reciprocate in said vertical slot to selectively raise and lower said piston.

References Cited by the Examiner
UNITED STATES PATENTS
2,618,500    11/52    Peach _____ 294—50.7
FOREIGN PATENTS
138,237    2/20    Great Britain.
331,051       35    Italy.

SAMUEL F. COLEMAN, Primary Examiner.
ANDRES H. NIELSEN, ERNEST A. FALLER, Jr.,
Examiners.